US011336150B2

(12) United States Patent
Okazaki

(10) Patent No.: US 11,336,150 B2
(45) Date of Patent: May 17, 2022

(54) ENERGY STORAGE SYSTEM AND SYSTEM ENABLING STABLE UTILIZATION OF VARIABLE ELECTRIC POWER

(71) Applicant: Sumitomo Electric Industries, Ltd., Osaka (JP)

(72) Inventor: Toru Okazaki, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 49 days.

(21) Appl. No.: 16/479,686

(22) PCT Filed: Nov. 9, 2017

(86) PCT No.: PCT/JP2017/040403
§ 371 (c)(1),
(2) Date: Jul. 22, 2019

(87) PCT Pub. No.: WO2018/139004
PCT Pub. Date: Aug. 2, 2018

(65) Prior Publication Data
US 2021/0028668 A1 Jan. 28, 2021

(30) Foreign Application Priority Data
Jan. 24, 2017 (JP) .............................. JP2017-010654

(51) Int. Cl.
*H02K 7/18* (2006.01)
*F01D 13/00* (2006.01)
(Continued)

(52) U.S. Cl.
CPC ......... *H02K 7/1823* (2013.01); *F01D 13/003* (2013.01); *F01D 15/10* (2013.01); *H02K 7/02* (2013.01); *H02K 7/108* (2013.01)

(58) Field of Classification Search
CPC ........ H02K 7/1823; H02K 7/02; H02K 7/108; F01D 13/003; F01D 15/10
(Continued)

(56) References Cited

U.S. PATENT DOCUMENTS 3,412,229 A * 11/1968 Seagrave, Jr. ......... H05B 6/145
219/619
3,508,024 A * 4/1970 Cannon .................. H05B 6/145
219/619
(Continued)

FOREIGN PATENT DOCUMENTS

GB 2 163 930 B * 5/1987 ............... H05B 6/10
JP 2004-350487 A 12/2004
(Continued)

OTHER PUBLICATIONS

New Energy News, Oct. 17, 2016, No. 63, p. 7 [with partial English translation].
(Continued)

*Primary Examiner* — Pedro J Cuevas
(74) *Attorney, Agent, or Firm* — Baker Botts L.L.P.; Michael A. Sartori

(57) ABSTRACT

An energy storage system includes a heat generation apparatus configured to generate heat from electric power and a heat storage device configured to store the heat generated by the heat generation apparatus, the heat generation apparatus including an electric motor connected to an electric power system and rotated by surplus electric power received from the electric power system, and a heat generator having a rotary unit rotated by the electric motor and a heat generating unit configured to generate heat through electromagnetic induction, and configured to convert rotational force of the electric motor to heat.

15 Claims, 8 Drawing Sheets

(51) Int. Cl.
*F01D 15/10* (2006.01)
*H02K 7/02* (2006.01)
*H02K 7/108* (2006.01)

(58) Field of Classification Search
USPC .............. 290/2, 44, 55; 219/618, 619, 631
See application file for complete search history.

(56) References Cited

U.S. PATENT DOCUMENTS

| | | | | |
|---|---|---|---|---|
| 3,562,472 A | * | 2/1971 | Cannon | H05B 6/145 219/619 |
| 3,961,151 A | * | 6/1976 | Danner | H01F 5/06 219/619 |
| 4,056,883 A | * | 11/1977 | Danner | H01F 5/06 29/611 |
| 4,181,846 A | * | 1/1980 | Cunningham | D06F 58/26 219/619 |
| 4,511,777 A | * | 4/1985 | Gerard | H05B 6/109 219/618 |
| 4,538,041 A | * | 8/1985 | Budzinski | H05B 6/102 219/632 |
| 4,613,763 A | * | 9/1986 | Swansen | F03D 9/25 290/44 |
| 4,614,853 A | * | 9/1986 | Gerard | H05B 6/109 165/185 |
| 4,629,844 A | * | 12/1986 | Griffith | B29C 48/845 219/618 |
| 4,678,881 A | * | 7/1987 | Griffith | B01F 7/00583 219/631 |
| 4,761,527 A | * | 8/1988 | Mohr | H05B 6/102 219/635 |
| 4,843,201 A | * | 6/1989 | Griffith | H05B 6/06 219/618 |
| 4,931,610 A | * | 6/1990 | Hughes | H05B 6/22 219/618 |
| 5,012,060 A | * | 4/1991 | Gerard | F22B 3/06 219/631 |
| 5,274,207 A | * | 12/1993 | Griffith | H05B 6/108 219/618 |
| 5,455,402 A | * | 10/1995 | Griffith | B29C 48/509 219/630 |
| 5,870,660 A | * | 2/1999 | Ito | G03G 15/2053 219/619 |
| 5,914,065 A | * | 6/1999 | Alavi | F04D 29/584 219/631 |
| 6,011,245 A | * | 1/2000 | Bell | F28D 15/02 219/631 |
| 6,144,020 A | * | 11/2000 | Usui | H05B 6/109 219/631 |
| 6,670,588 B2 | * | 12/2003 | Kitano | G03G 15/2053 219/619 |
| 7,071,581 B2 | * | 7/2006 | Eisenhaure | H02J 9/08 307/64 |
| 7,339,144 B2 | * | 3/2008 | Lunneborg | H05B 6/108 219/631 |
| 7,420,144 B2 | * | 9/2008 | Lunneborg | H02K 49/108 219/628 |
| 7,531,924 B2 | * | 5/2009 | Kwon | H02K 3/51 310/52 |
| 7,573,009 B2 | * | 8/2009 | Lunneborg | H05B 6/108 219/628 |
| 7,893,637 B2 | * | 2/2011 | Suhama | B60L 7/16 318/376 |
| 8,408,378 B1 | * | 4/2013 | Albertson | F24H 3/0405 198/370.09 |
| 8,418,832 B1 | * | 4/2013 | Albertson | F24H 3/0417 198/370.09 |
| 8,511,456 B1 | * | 8/2013 | Albertson | F24H 3/0417 198/370.09 |
| 8,511,457 B1 | * | 8/2013 | Albertson | H05B 6/108 198/370.09 |
| 8,534,448 B1 | * | 9/2013 | Albertson | F24H 3/0417 198/370.09 |
| 8,573,381 B1 | * | 11/2013 | Albertson | F24H 3/0417 198/370.09 |
| 8,622,195 B2 | * | 1/2014 | Albertson | H05B 6/108 198/370.09 |
| 8,640,851 B2 | * | 2/2014 | Albertson | H05B 6/108 198/370.09 |
| 8,844,706 B2 | * | 9/2014 | Albertson | H05B 6/108 198/370.09 |
| 8,866,053 B2 | * | 10/2014 | Berdut-Teruel | H05B 6/108 219/672 |
| 9,300,185 B2 | * | 3/2016 | Arihara | H02P 9/00 |
| 9,338,833 B2 | * | 5/2016 | Albertson | F24H 3/0417 |
| 9,370,050 B2 | * | 6/2016 | Okazaki | F03D 80/82 |
| 9,473,049 B2 | * | 10/2016 | Okazaki | H02N 99/00 |
| 9,605,657 B2 | * | 3/2017 | Okazaki | H05B 6/109 |
| 9,617,980 B2 | * | 4/2017 | Okazaki | F03D 9/22 |
| 9,618,264 B1 | * | 4/2017 | Berdut-Teruel | F26B 23/04 |
| 10,184,451 B2 | * | 1/2019 | Okazaki | F03D 9/18 |
| 10,590,594 B2 | * | 3/2020 | Berdut-Teruel | F26B 21/04 |
| 10,750,579 B2 | * | 8/2020 | Okazaki | H05B 6/04 |
| 10,764,969 B2 | * | 9/2020 | Okazaki | F03D 9/25 |
| 10,840,735 B1 | * | 11/2020 | Cooper | H02J 3/14 |
| 2002/0101119 A1 | * | 8/2002 | Eisenhaure | H02J 9/08 307/64 |
| 2003/0042251 A1 | * | 3/2003 | Kitano | G03G 15/2053 219/619 |
| 2008/0110664 A1 | * | 5/2008 | Kwon | H02K 9/22 174/125.1 |
| 2009/0243522 A1 | * | 10/2009 | Suhama | H02P 21/06 318/376 |
| 2011/0272399 A1 | * | 11/2011 | Berdut-Teruel | H05B 6/109 219/672 |
| 2012/0193924 A1 | * | 8/2012 | Okazaki | F03D 80/82 290/55 |
| 2013/0193788 A1 | * | 8/2013 | Arihara | H02K 7/18 310/74 |
| 2014/0110938 A1 | * | 4/2014 | Okazaki | H05B 6/108 290/2 |
| 2015/0192109 A1 | * | 7/2015 | Okazaki | F03D 9/25 290/55 |
| 2015/0222113 A1 | | 8/2015 | Kasai et al. | |
| 2016/0201650 A1 | * | 7/2016 | Okazaki | F03D 9/11 290/44 |
| 2016/0252076 A1 | * | 9/2016 | Okazaki | H05B 6/109 290/52 |
| 2018/0295678 A1 | * | 10/2018 | Okazaki | H05B 6/44 |
| 2019/0161906 A1 | * | 5/2019 | Berdut-Teruel | F26B 11/04 |
| 2019/0239294 A1 | * | 8/2019 | Okazaki | F24H 1/18 |
| 2020/0187310 A1 | * | 6/2020 | Seiwald | H02K 49/043 |

FOREIGN PATENT DOCUMENTS

| | | |
|---|---|---|
| JP | 2011-102576 A | 5/2011 |
| JP | 2011-129433 A | 6/2011 |
| JP | 2011-159595 A | 8/2011 |
| JP | 2011-169171 A | 9/2011 |
| JP | 2011-216325 A | 10/2011 |
| JP | 2011-233488 A | 11/2011 |
| JP | 2012-195230 A | 10/2012 |
| JP | 2012-197796 A | 10/2012 |
| JP | 2012-223051 A | 11/2012 |
| JP | 2012-256507 A | 12/2012 |
| JP | 2014-025410 A | 2/2014 |
| JP | 2015-046984 A | 3/2015 |
| WO | 2010/114180 A1 | 10/2010 |
| WO | 2014/024731 A1 | 2/2014 |

OTHER PUBLICATIONS

"To construct Tres Amigas SuperStation", No. 40, May 27, 2011 http://overhead-tml.net/tml2/topics-3.html.

\* cited by examiner

ENERGY STORAGE SYSTEM AND SYSTEM ENABLING STABLE UTILIZATION OF VARIABLE ELECTRIC POWER

TECHNICAL FIELD

The present invention relates to an energy storage system and a system enabling stable utilization of variable electric power. The present application claims priority based on Japanese Patent Application No. 2017-010654 filed on Jan. 24, 2017. All the contents described in the Japanese patent application are incorporated herein by reference.

BACKGROUND ART

Introduction of electric power generation using renewable energy such as solar photovoltaic power generation and wind power generation is in progress from the viewpoints of resource issues, environmental issues, safety and the like. With this type of electric power generation, the amount of electric power generated varies with weather, wind conditions, etc. and furthermore, cannot be adjusted in accordance with demand, and it is thus difficult for this type of electric power generation to stably supply electric power. If renewable energy is increasingly introduced, the amount of electric power generated exceeds demand, that is, surplus electric power is generated, and accordingly, as an approach for handling surplus electric power, storing surplus electric power in pumped storage power generation, storage batteries, and the like to maintain balance between supply and demand has been implemented or considered.

For example, PTL 1 and NPL 1 disclose that electric power generated by wind power generation is converted to heat by an electric heater and the heat is stored in a heat storage device (e.g., rock, crushed stone, etc.) and used depending on demand to generate electric power.

For example, PTLs 2 to 10 disclose a technology relevant to a so-called wind-powered thermal power generation system that converts the rotational force of a wind turbine to heat through electromagnetic induction and converts the heat to electric power. PTLs 2 to 8 describe an induction heating device (a heat generator) which is connected to a wind turbine and utilizes induction heating to convert rotational force to heat to thereby heat a heat transfer medium. PTLs 9 and 10 describe a technique of causing an induction motor (for example, a canned motor) connected to the rotation shaft of a wind turbine to operate as a heat generator to generate heat.

CITATION LIST

Patent Literature

PTL 1: Japanese Patent Laying-Open No. 2011-169171
PTL 2: Japanese Patent Laying-Open No. 2011-102576
PTL 3: Japanese Patent Laying-Open No. 2011-159595
PTL 4: Japanese Patent Laying-Open No. 2011-216325
PTL 5: Japanese Patent Laying-Open No. 2011-233488
PTL 6: Japanese Patent Laying-Open No. 2012-195230
PTL 7: Japanese Patent Laying-Open No. 2012-197796
PTL 8: Japanese Patent Laying-Open No. 2012-256507
PTL 9: Japanese Patent Laying-Open No. 2014-025410
PTL 10 Japanese Patent Laying-Open No. 2015-046984

Non Patent Literature

NPL 1: New Energy News, Oct. 17, 2016, No. 63, page 7

SUMMARY OF INVENTION

The presently disclosed energy storage system comprises a heat generation apparatus configured to generate heat from electric power and a heat storage device configured to store the heat generated by the heat generation apparatus, the heat generation apparatus including an electric motor connected to an electric power system and rotated by surplus electric power received from the electric power system, and a heat generator having a rotary unit rotated by the electric motor and a heat generating unit configured to generate heat through electromagnetic induction, and configured to convert rotational force of the electric motor to heat.

DETAILED DESCRIPTION

Figure 1:
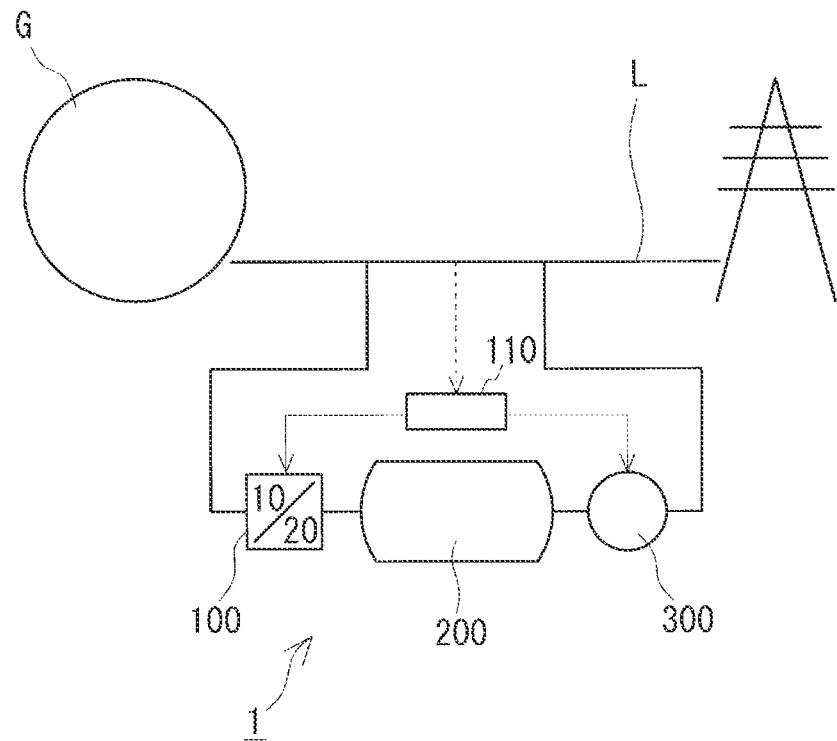
FIG. 1 is a conceptual diagram showing an example of an energy storage system according to an embodiment.

Problem to be Solved by the Present Disclosure

It is expected that renewable energy will be increasingly introduced. However, when a large amount of unstable electric power source such as solar photovoltaic power generation and wind power generation is interconnected to an electric power system, not only is surplus electric power caused by output fluctuation generated, but also frequency fluctuation occurs in the electric power system, which makes it difficult to maintain the system's frequency (or invites insufficient frequency controllability), and thus causes deterioration of electric power in quality and may have a larger effect on the electric power system in stability. If the electric power system has a large frequency fluctuation, then, in some cases, an electric power generator connected to the electric power system may be pulled out of synchronism, and the electric power system may no longer be stably maintained. Therefore, from the viewpoint of the efficiency and stabilization of the electric power system accompanying mass introduction of renewable energy, it is desirable to develop an energy storage system capable of storing surplus electric power and having a frequency adjustment function.

Pumped storage power generation has been put to practical use as one approach to handle surplus electric power. One type of pumped storage power generation is a variable speed pumped storage power generation capable of performing frequency adjustment when pumping up water by driving a pumping hydraulic turbine by an electric power generator motor using surplus electric power. However, pumped storage power generation is limited in where it is sited or the like, and it is thus difficult to increasingly construct pumped storage power generation in response to mass introduction of renewable energy. As another approach, installing a storage battery along with an unstable electric power source such as solar photovoltaic power generation and wind power generation is also considered, however, introducing the storage battery is costly and the storage battery also has a short life and many other problems.

In addition, as described in PTL 1 and NPL 1, for example, providing an electric power system with an energy storage system which converts surplus electric power of wind power generation to heat by an electric heater and stores the heat in a heat storage device is considered. While such an energy storage system which stores electric power as heat is less efficient than a storage battery, it can be introduced at low cost and has a long life, etc. and is thus excellently cost-effective. However, although the energy storage system can absorb surplus electric power, the electric heater does not have a frequency adjustment function, and the energy storage system does not contribute to stabilization of an electric power system when surplus electric power is generated.

One object of the present disclosure is to provide an energy storage system which can absorb surplus electric power of an electric power system and also has a frequency adjustment function.

Advantageous Effect of the Present Disclosure

The presently disclosed energy storage system can absorb surplus electric power and has a frequency adjustment function.

DESCRIPTION OF EMBODIMENTS

Initially, embodiments of the present invention will be enumerated and described.

(1) In one aspect of the present invention, an energy storage system comprises a heat generation apparatus configured to generate heat from electric power and a heat storage device configured to store the heat generated by the heat generation apparatus, the heat generation apparatus including an electric motor connected to an electric power system and rotated by surplus electric power received from the electric power system, and a heat generator having a rotary unit rotated by the electric motor and a heat generating unit configured to generate heat through electromagnetic induction, and configured to convert rotational force of the electric motor to heat.

In the energy storage system, the heat generation apparatus converts surplus electric power to heat. The heat generation apparatus has a configuration in which an electric motor and a heat generator are combined together. Comprising the electric motor connected to an electric power system allows a frequency adjustment function to be implemented, which is effective in stabilizing the electric power system. The electric motor connected to an electric, power system has an inertial force as the electric motor rotates. When the electric, power system has a fluctuation in frequency due to an unstable electric power source such as solar photovoltaic power generation and wind power generation, the inertia force allows energy to be input/output to absorb the fluctuation in frequency to enable instantaneous frequency adjustment. Furthermore, a reactive-power absorption effect can also be expected. Further, comprising the heat generator converting the rotational force of the electric motor to heat allows surplus electric power to be absorbed. The energy storage system that comprises the heat storage device that stores heat generated by the heat generation apparatus can store surplus electric power as heat.

Thus the energy storage system can absorb surplus electric power and also has a frequency adjustment function, and accordingly, exhibits an effect in stabilizing the electric power system (or maintaining electric power in quality).

(2) In one aspect of the energy storage system, the electric motor is a synchronous motor or an induction motor, and the heat generator is coupled to a rotation shaft of the electric motor.

The electric motor is for example an AC motor such as a synchronous motor or an induction motor. The configuration in which the heat generator is coupled to the rotation shaft of the electric motor allows the electric motor and the heat generator to be functionally separated from each other, and the heat generation apparatus can be simplified in configuration and easily controlled. Inter alia, the synchronous motor is effective in absorbing reactive power. The induction motor is typically a three-phase induction motor.

(3) In one aspect of the energy storage system, the electric motor is an induction motor, and the electric motor per se also serves as the heat generator.

An induction motor can be operated as a heat generator, and when the electric motor is an induction motor, the electric motor per se can also serve as a heat generator. This allows the heat generation apparatus to be miniaturized.

(4) in one aspect of the energy storage system, the induction motor is a wound-rotor induction motor.

An induction motor (a three-phase induction motor) includes a squirrel cage induction motor and a wound-rotor induction motor. When the electric motor is a wound-rotor induction motor, it is possible to expect improvement of electric power in quality, such as enhanced instantaneous frequency adjustment performance.

(5) In one aspect of the energy storage system, the energy storage system further comprises a flywheel on the rotational shaft of the electric motor.

Comprising a flywheel allows the electric motor to have increased inertia force and thus facilitates instantaneous frequency adjustment.

(6) In one aspect of the energy storage system, the heat generator has the heat generating unit fixed.

The heat generator having the heat generating unit fixed facilitates extracting heat from the heat generator.

(7) In one aspect of the energy storage system, the heat generator has the heat generating unit disposed outside the rotary unit.

The heat generator having the heat generating unit disposed outside facilitates extracting heat from the heat generator.

(8) In one aspect of the energy storage system, the heat generator includes a superconducting coil, and the superconducting coil causes the heat generating unit to cause electromagnetic induction.

Using a superconducting coil allows a strong magnetic field to be generated, and electromagnetic induction allows the heat generating unit to generate heat of higher temperature. For example, it is also possible to generate heat above 700° C.

(9) In one aspect of the energy storage system, the energy storage system further comprises an electric power generation apparatus configured to generate electric power using heat stored in the heat storage device.

By comprising an electric power generation apparatus, the electric power storage system can be implemented to allow energy stored by converting surplus electric power to heat to be extracted as electric power. For example, the electric power generation apparatus may be connected to an electric power system, and when there is an increasing demand in the electric power system, electric power generated by the electric power generation apparatus may be fed to the electric power system. In addition, electric power generated by the electric power generation apparatus may be used for production of hydrogen through electrolysis of water. The heat stored in the heat storage device can be used not only for electric power generation but also be used as it is, that is, as heat, and for example used for heating, hot water supply, thermochemical reaction, etc.

(10) In one aspect of the present invention, a system enabling stable utilization of variable electric power comprises the energy storage system according to item (9) above, and a switch configured to connect the electric power generation apparatus to any one of the electric power system and a second electric power system.

In the above system enabling stable utilization of variable electric power, the energy storage system converts surplus electric power to heat and thus stores it, which is effective in stabilizing the electric power system. Furthermore, by extracting the stored energy as electric power, the stored energy can be used effectively.

(11) In one aspect of the system enabling stable utilization of variable electric power, the electric power generation apparatus includes: a first steam turbine; a first electric power generator coupled to the first steam turbine and configured to supply the electric power system with AC electric power; a second steam turbine; and a second electric power generator coupled to the second steam turbine and configured to supply the second electric power system with AC electric power.

By using the first generator and the second generator, two electric power systems can each be supplied with electric power.

(12) In one aspect of the system enabling stable utilization of variable electric power, the electric power generation apparatus includes a steam turbine and an electric power generator coupled to the steam turbine, and the electric power generator is configured to be driven by the steam turbine to supply the electric power system with AC electric power of a first frequency and the second electric power system with second AC electric power having a second frequency different from the first frequency.

By changing the driving of the electric power generator by the steam turbine, AC electric power different in frequency can be generated. For example, in Japan, mutual accommodation of electric power can be done through frequency conversion.

(13) In one aspect of the system enabling stable utilization of variable electric power, the electric power generation apparatus includes: an electric power generator; a first steam turbine configured to drive the electric power generator to allow the electric power generator to supply the electric power system with AC electric power of a first frequency; a first clutch configured to couple the first steam turbine to the electric power generator; a second steam turbine configured to drive the electric power generator to allow the electric power generator to supply the electric power system with AC electric power of a second frequency different from the first frequency; a second clutch configured to couple the second steam turbine to the electric power generator; and a three-way valve configured to supply one of the first steam turbine and the second steam turbine with steam.

By switching the driving of the electric power generator between the first and second steam turbines, AC electric power different in frequency can be generated. For example, in Japan, mutual accommodation of electric power can be done through frequency conversion.

(14) In one aspect of the system enabling stable utilization of variable electric power, the electric power generation apparatus includes a steam turbine and an electric power generator coupled to the steam turbine, and the steam turbine is a bleeder turbine.

In addition to supplying electric power by the electric power generator, by using a bleeder turbine, heat can be supplied.

DETAILED DESCRIPTION OF EMBODIMENTS

A specific example of an energy storage system according to an embodiment of the present invention will now be described below with reference to the drawings. In the figures, identical reference characters denote identical or equivalent components. Note that the present invention is defined by the terms of the claims, rather than these examples, and is intended to include any modifications within the meaning and scope equivalent to the terms of the claims.

EMBODIMENTS

With reference to FIGS. 1 to 10, an energy storage system 1 according to an embodiment will be described. Energy storage system 1 shown in FIG. 1 is installed in an electric power system L and comprises a heat generation apparatus 100 and a heat storage device 200. In this example, electric power system L further comprises an electric power generation apparatus 300. One feature of energy storage system 1 is that heat generation apparatus 100 includes an electric motor 10 connected to electric power system L and a heat generator 20 which converts the rotational force of electric motor 10 to heat. In the following, initially, a configuration of energy storage system 1 will be described with reference to FIG. 1, and subsequently, a configuration of heat generation apparatus 100 will be described in detail mainly with reference to FIGS. 2-10.

Electric Power System

Electric power system L is a facility which supplies electric power generated by an electric power source G to a consumer. Electric power source G is composed of a group of electric power generators connected to electric power system L. Electric power source G includes, for example, various electric power sources such as renewable energy power sources represented by solar photovoltaic power generation, wind power generation and the like, as well as general electric power sources such as thermal power generation, nuclear power generation and hydroelectric power generation.

Heat Generation Apparatus

Heat generation apparatus 100 is an apparatus which generates heat from electric power, and more specifically, it is connected to electric power system L and converts surplus electric power of electric power system L to heat. Heat generation apparatus 100 has a configuration in which electric motor 10 and heat generator 20 are combined together. This example comprises a control unit 110 which controls heat generation apparatus 100 in accordance with surplus electric power of electric power system L, and when electric power system L has surplus electric power, heat generation apparatus 100 is operated by control unit 110. For example, electric power system L is provided with an electric power monitoring, system (not shown) to monitor an amount of electric power generated (or supplied) by electric power source G, an amount consumed (or demanded) by a consumer, and the like. The electric power monitoring system monitors demand for and supply of electric power of electric power system L, and issues an operation command to control unit 110 based on the supply of and demand for electric power. Control unit 110 receives the operation command from the electric power monitoring system when surplus electric power is generated, and control unit 110 issues a control command to electric motor 10, heat generator 20 and the like to control heat generation apparatus 100 (electric motor 10, heat generator 20) depending on surplus electric power.

Heat Storage Device

Heat storage device 200 is a device which stores the heat generated by heat generation apparatus 100. Heat storage device 200 can be a known device, and for example it has a structure in which a heat storage material is introduced in a heat insulative container. The heat storage material can be a heat storage material which has been put to practical use in concentrated solar thermal power generation, such as rock, crushed stone, molten salt and the like.

Electric Power Generation Apparatus

Electric power generation apparatus 300 is an apparatus which generates electric power by using the heat stored in heat storage device 200, and is connected to electric power system L. Electric power generation apparatus 300 can be a known apparatus, and is for example composed of a steam turbine and an electric power generator.

In this example, a heat transfer medium is heated by heat generation apparatus 100, and the heated heat transfer medium is supplied to heat storage device 200, and the heated heat transfer medium's heat is used to heat the heat storage material to thus store heat. Specifically, heat storage device 200 is provided with two heat exchange circuits, and the heat transfer medium is supplied to one of the heat exchange circuits to heat the heat storage material and thus store heat in the heat storage material. Further, when extracting heat from heat storage device 200, for example, the other heat exchange circuit is supplied with water to generate steam and to thus extract heat stored in the heat storage material. The extracted heat (or steam) is sent to electric power generation apparatus 300 to thereby operate the steam turbine to drive the electric power generator to generate electric power. Electric power generation apparatus 300 is controlled depending on demand for electric power, and when the demand increases, electric power generation apparatus 300 generates electric power and feeds the electric power to electric power system L. In this example, electric power generation apparatus 300 is controlled by control unit 110, and operates when demand for electric power of electric power system L increases. For example, when demand for electric power increases, an operation command is sent from the electric power monitoring system to control unit 110, and in response to the operation command, control unit 110 issues a control command to electric power generation apparatus 300 to control electric power generation apparatus 300 depending on demand for electric power.

A configuration of heat generation apparatus 100 will now be described in detail. Heat generation apparatus 100 comprises electric motor 10 connected to electric power system L, and heat generator 20 converting the rotational force of electric motor 10 to heat. Electric motor 10 is rotated by surplus electric power received from electric power system L. Heat generator 20 has a rotary unit 21 rotated by electric motor 10 and a heat generating unit 22 generating heat through electromagnetic induction (see FIGS. 3 and 5). Electric motor 10 is operated by control unit 110 depending on surplus electric power. Heat generation apparatus 100 includes a separation type in which electric motor 10 and heat generator 20 are separated (a first embodiment) and an integrated type in which electric motor 10 per se also serves as heat generator 20 (a second embodiment), as will be described hereinafter.

First Embodiment

Figure 2:
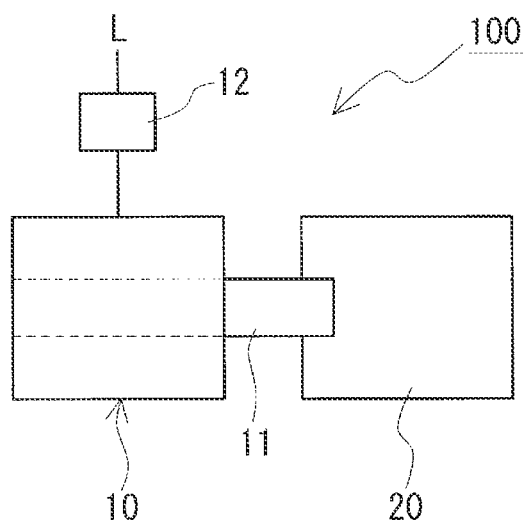
FIG. 2 is a conceptual diagram of a heat generation apparatus of a first embodiment.
Figure 3:
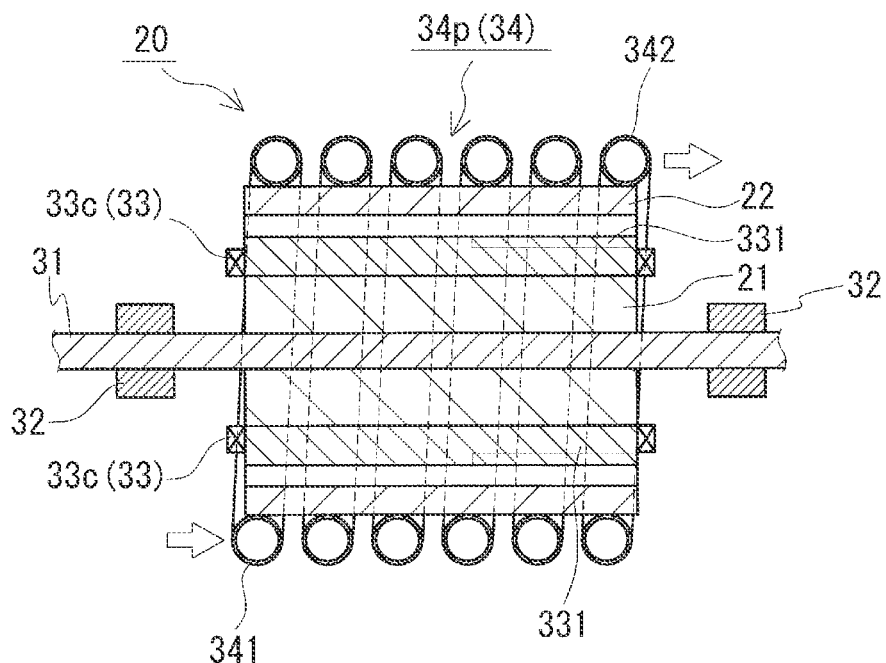
FIG. 3 is a schematic vertical sectional view showing an example of a configuration of a heat generator in the heat generation apparatus of the first embodiment.

In the first embodiment, heat generation apparatus 100 of the separation type will be described with reference to FIGS. 2 to 4. In heat generation apparatus 100 according to the first embodiment, as shown in FIG. 2, heat generator 20 is coupled to a rotation shaft 11 of electric motor 10.

Electric Motor

Electric motor 10 is a synchronous motor or an induction motor, and can be any known such motor. The induction motor is typically a three-phase induction motor, and may be either a squirrel cage induction motor or a wound-rotor induction motor. As shown in FIG. 2, electric motor 10 is connected to electric power system L via an electric power conversion device 12, and receives electric power converted by electric power conversion device 12. Electric power conversion device 12 is controlled by control unit 110 (see FIG. 1).

Heat Generator

Heat generator 20 is driven by electric motor 10. An example of heat generator 20, as shown in FIGS. 3 and 4, has a configuration comprising rotary unit 21, heat generating unit 22, a magnetic flux generating unit 33, and a heat transfer medium channel 34.

Rotary Unit

Rotary unit 21 has a rotation shaft 31 connected to rotation shaft 11 of electric motor 10 (see FIG. 2), and rotates as rotation shaft 11 of electric motor 10 rotates. Rotation shaft 31 is rotatably supported by a bearing 32 (see FIG. 3). Rotation shaft 31 may be directly connected to rotation shaft 11 of electric motor 10 or may be connected thereto via a speed up gear (not shown). In the case of direct connection, a trouble caused by the speed up gear (or gearbox) can be avoided.

Figure 4:
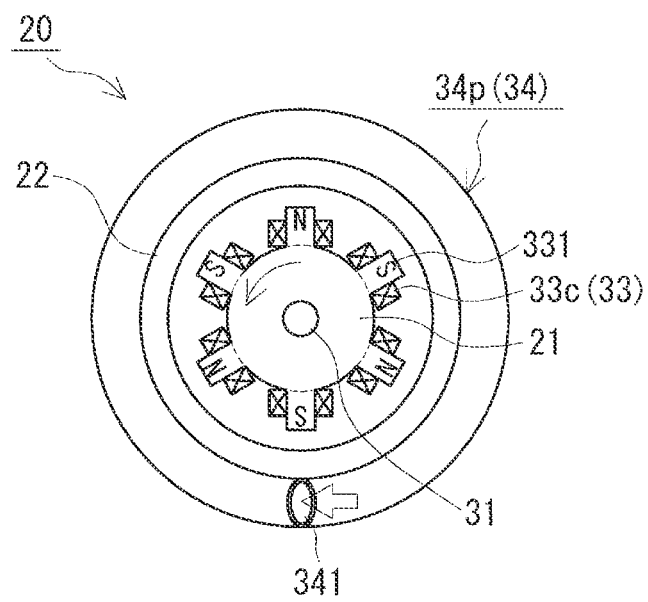
FIG. 4 is a schematic front view of the heat generator shown in FIG. 3.

Rotary unit 21 circumferentially has a plurality of radially protruding protrusions 331 (see FIG. 4). In this example, it has circumferentially equidistant six protrusions 331. In addition, rotary unit 21 has magnetic flux generating unit 33 (in this example, a coil 33c), which will be described hereinafter, attached thereto circumferentially. Rotary unit 21 rotates counterclockwise for the sake of illustration. In FIG. 4, a thin-line arrow indicated for rotary unit 21 indicates the direction in which rotary unit 21 rotates.

Rotary unit 21 may be formed of any material, whether it may be magnetic or non-magnetic, insofar as it has mechanical strength and is capable of supporting magnetic flux generating unit 33, and preferably it is a material excellent in structural strength and long-term durability (weatherability and corrosion resistance). For example, the material includes iron, steel, stainless steel, aluminum alloy and magnesium alloy and other similar metallic materials, and GFRP (glass fiber reinforced plastic), CFRP (carbon fiber reinforced plastic) and other similar composite materials.

In this example, rotary unit 21 (including protrusion 33) is formed of a magnetic material. When magnetic flux generating unit 33 (coil 33c) is a normal conducting coil, it is preferable to form rotary unit 21 of a magnetic material. On the other hand, when a superconducting coil is used, rotary unit 21 may be formed of either a magnetic material or a nonmagnetic material. When a superconducting coil is used, it may be preferable to form rotary unit 21 of a nonmagnetic material since there is a possibility that magnetic flux saturation of rotary unit 21 may limit an electric field that is generated.

Heat Generating Unit

Heat generating unit 22 is disposed such that it is spaced from rotary unit 21. In this example, heat generating unit 22 is cylindrical, and is disposed outside rotary unit 21 and fixed to a casing (not shown) so that heat generating unit 22 does not rotate. As magnetic flux caused by magnetic flux generating unit 33, which will be described hereinafter, passes, heat generating unit 22 generates an induced current (or an eddy current) through electromagnetic induction, and the electrical resistance against the induced current allows heat generating unit 22 to generate heat. Heat generating unit 22 may be formed of material which generates heat through electromagnetic induction, and for example, conductive magnetic materials, such as iron, steel, and stainless steel, are preferable.

Magnetic Flux Generating Unit

Magnetic flux generating unit 33 is attached to rotary unit 21, and generates magnetic flux for heat generating unit 22 and thus causes heat generating unit 22 to cause electromagnetic induction. In this example, magnetic flux generating unit 33 is provided on rotary unit 21 circumferentially to face heat generating unit 22, and generates magnetic flux toward heat generating unit 22. For magnetic flux generating unit 33, coil 33c is used, and rotary unit 21 has each protrusion 331 with coil 33c (six coils in total) wound thereon and thus attached thereto (see FIG. 4). When protrusion 331 is formed of a magnetic material, magnetic flux generating unit 33 will be composed of coil 33c and protrusion 331. A DC electric power supply is connected to each coil 33c for example via a slip ring, and a current passing through each coil 33c is controlled in direction to allow adjacent coils 33c to be different from each other in polarity (see FIG. 4). The number of magnetic flux generating units 33 (or coils 33c) may be set as appropriate, and may be, for example, tour or more, six or more, or furthermore, eight or more.

While magnetic flux generating unit 33 is a coil (or an electromagnet), it may be a permanent magnet. The coil includes a normal conducting coil such as a copper wire, and a superconducting coil using a superconducting wire. When the coil is used, passing a large current through the coil can generate a large magnetic field, and controlling a current to be passed through the coil can adjust the magnetic field in strength. An amount of heat generated through electromagnetic induction is proportional to the square of magnetic field strength, and when a coil is compared with a permanent magnet, the former facilitates improving the amount of heat generated. Furthermore, when a coil is compared with a permanent magnet, the former is more resistant to reduction of magnetic characteristics due to increased temperature, deterioration of magnetic characteristics over time, and the like. Thus, when a coil is used for magnetic flux generating unit 33, it is easy to increase a current passing therethrough to maintain sufficient magnetic field strength and hence it is easy to obtain performance (thermal energy) enough to cause heat generating unit 22 to generate heat to attain a predetermined temperature (for example of 100° C. or higher, furthermore, 200° C. or higher). When a direct current is passed through to the coil to generate a direct current magnetic field, and the coil is a superconducting coil, electrical resistance is zero, and if a large current is passed, the coil does not generate substantial heat (or cause substantial loss). Thus, when the coil that is a superconducting coil is compared with a normal conducting coil, the former can suppress its heat generation (or loss) caused by passing a large current and generate a significantly intense magnetic field without loss of electric power. When a superconducting coil is used for coil 33c, its strong magnetic field allows heat generating unit 22 to be heated to a higher temperature and can also cause heat generating unit 22 to generate heat equal to or greater than the Curie temperature of the magnetic material forming heat generating unit 22 (e.g., exceeding 700° C.). When a superconducting coil is used, it may be surrounded by a cooling jacket and thus cooled to maintain a superconducting state.

Heat Transfer Medium Channel

Heat generating unit 22 is provided with heat transfer medium channel 34 through which a heat transfer medium flows. The heat transfer medium receives heat from heat generating unit 22 and is thus heated. In this example, heat transfer medium channel 34 surrounds heat generating unit 22 circumferentially and extends axially and helically, and heat transfer medium channel 34 has one end with an inlet 341 to receive the heat transfer medium and the other end with an outlet 342 to discharge the heat transfer medium (see FIG. 3). Heat transfer medium channel 34 is composed of a pipe 34p formed for example of a metal material such as iron, steel, stainless steel or the like. The heat transfer medium includes, for example, water, water vapor, oil, liquid metal (Na, Pb, etc.), molten salt or a similar liquid, and gas.

Heat generator 20 generates heat in a mechanism, as will be described below: Magnetic flux generating unit 33 (or coil 33c) generates magnetic flux which in turn passes through heat generating unit 22, When the magnetic flux passes through heat generating unit 22, the magnetic field is strong in a region of heat generating unit 22 which faces magnetic flux generating unit 33 and the magnetic flux of magnetic flux generating unit 33 links with, and large magnetic flux passes therethrough. On the other hand, the magnetic field is weaken in a region of heat generating unit 22 which does not face magnetic flux generating unit 33 and the magnetic flux of magnetic flux generating unit 33 does not link with, and reduced magnetic flux passes therethrough. And as magnetic flux generating unit 33 rotates with rotary unit 21, magnetic flux generating unit 33 moves relative to heat generating unit 22, so that the magnetic flux passing through heat generating unit 22 along its entire circumference changes and the magnetic field applied to heat generating unit 22 thus periodically changes. As a result, an eddy current is generated in heat generating unit 22 and heat generating unit 22 thus generates heat, and the heat is transferred to the heat transfer medium flowing through heat transfer medium channel 34 (or pipe 34p) and thus heats the heat transfer medium.

In this example, adjacent magnetic flux generating units 33 (or coils 33c) are different from each other in polarity, and the magnetic flux (or magnetic field) is reversed in direction between when magnetic flux generating unit 33 of the N pole is faced and when magnetic flux generating unit 33 of the S pole is faced. Therefore, when magnetic flux generating unit 33 rotates with rotary unit 21, the magnetic flux (or magnetic field) has its direction periodically reversed and thus changed. Note that even if each magnetic flux generating unit 33 has the same polarity (for example, if the outer circumferential side of rotary unit 21 has the N pole and the center side thereof has the S pole), the magnetic field is intensified at the portion of heat generating unit 22 facing magnetic flux generating unit 33 and the magnetic field is weakened between such portions. Accordingly, as magnetic flux generating unit 33 rotates with rotary unit 21, the magnetic field will periodically changes in strength, so that an eddy current is generated in heat generating unit 22 and thus causes heat generating unit 22 to generate heat. In that case, however, the magnetic field is not reversed in direction. When adjacent magnetic flux generating units 33 are different from each other in polarity, and the magnetic field is reversed in direction, the magnetic field applied to heat generating unit 22 is increased in amplitude (or significantly changes), so that a larger eddy current can be generated and an increased amount of heat can be generated.

Further, in this example, by changing the magnitude of the current passing through coil 33c, the amount of heat generated by heat generator 20 can be controlled and the magnitude of the load of electric motor 10 can be changed. Specifically, when the maximum amount of heat that heat generator 20 can generate when electric motor 10 rotates at the rated output is represented as 100%, the amount heat generated by heat generator 20 can be controlled in a range of 0 to 100%. And when the load of electric motor 10 when the amount of heat generated by heat generator 20 is 100% is represented as 100%, the load can be changed in a range of 0 to 100% by controlling the amount of heat generated by heat generator 20. Since electric motor 10 is rotated by surplus electric power received from electric power system L, electric motor 10 will have rotational force varying with the amount of the surplus electric power, however, the load of electric motor 10 can be changed by controlling the amount of heat generated by heat generator 20. As such, when surplus electric power is small and electric motor 10 has reduced rotational force the amount of heat generated by heat generator 20 can be reduced whereas when surplus electric power is large and electric motor 10 has increased rotational force the amount of heat generated by heat generator 20 can be increased so that the surplus electric power can be maximally converted to heat while electric motor 10 is kept rotated. That is, heat generation apparatus 100 has a wide operable range. In general, variable speed pumped storage power generation has an adjustable load range (an operation range of a generator motor in a pumping operation) of about 10% of the rated output, and accordingly it is believed that the wide range of the above operable range more contributes to stabilization of electric power system L. The current passed through coil 33c is controlled, depending on the surplus electric power, for example by a control command issued from control unit 110 (see FIG. 1).

Second Embodiment

Figure 5:
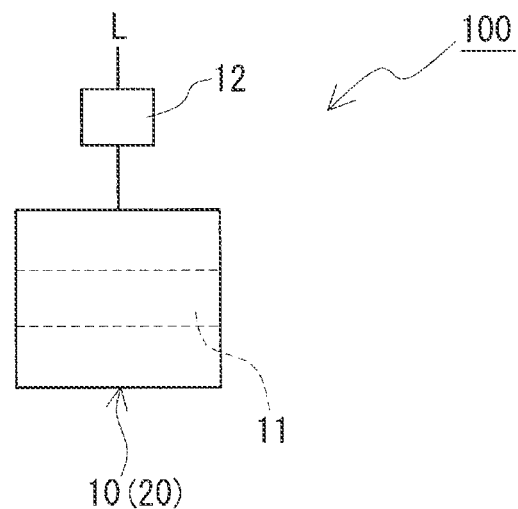
FIG. 5 is a conceptual diagram of a heat generation apparatus of a second embodiment.
Figure 6:
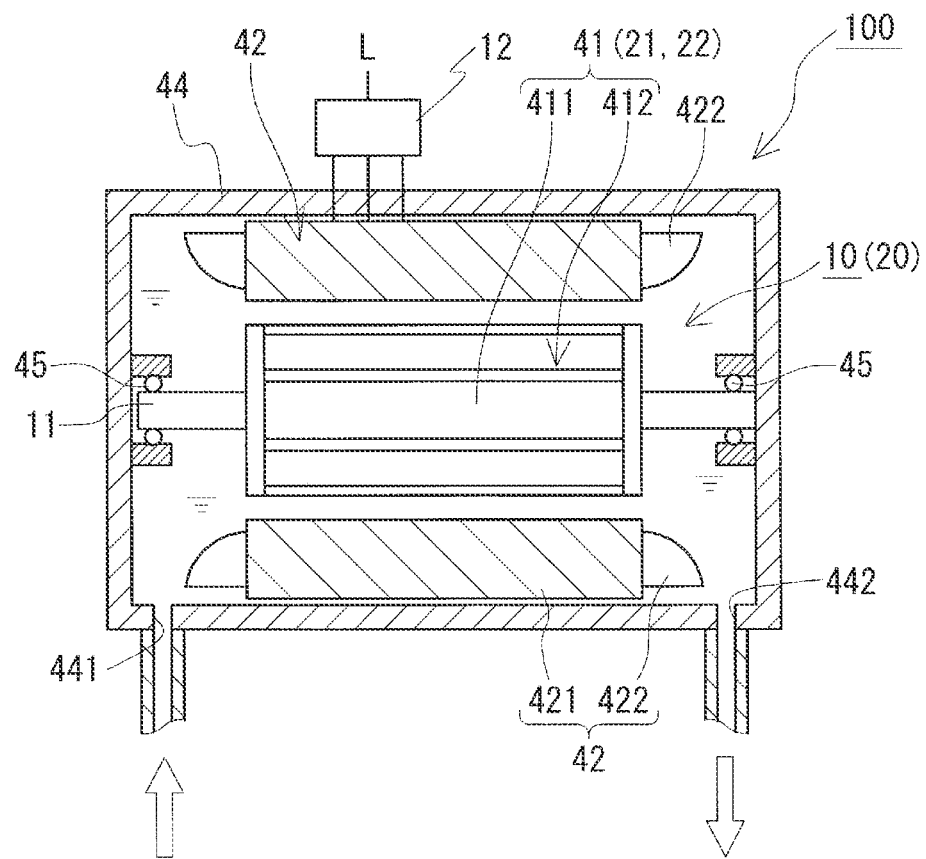
FIG. 6 schematically shows an example of a configuration of the heat generation apparatus of the second embodiment.
Figure 7:
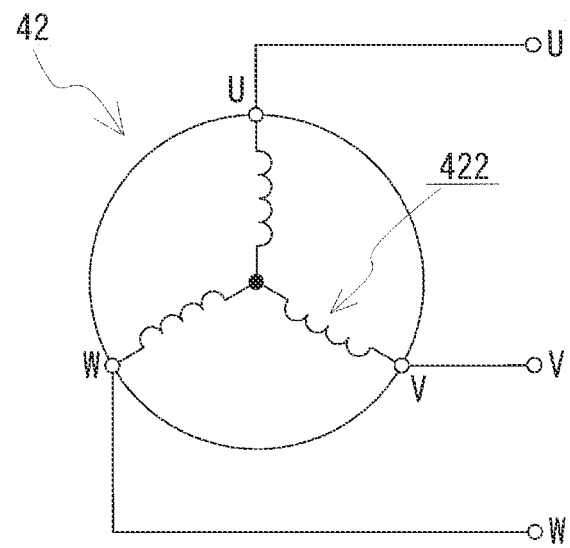
FIG. 7 is a diagram for illustrating an example of connection of a stator winding.

In a second embodiment, heat generation apparatus 100 of an integrated type will be described with reference to FIGS. 5 to 9. In heat generation apparatus 100 of the second embodiment, as shown in FIG. 5, electric motor 10 per se also functions as heat generator 20. In heat generation apparatus 100 of the second embodiment, electric motor 10 is an induction motor. As an example of heat generation apparatus 100 of the second embodiment, as shown in FIG. 6, electric motor 10 is housed in a vessel 44 through which a heat transfer medium passes.

Electric motor 10 is a three-phase induction motor, and in this example, it is a squirrel cage induction motor. As shown in FIG. 6, electric motor 10 includes a rotor 41 and a stator 42 spaced from rotor 41. In this example, rotor 41 is attached to rotation shaft 11, and rotor 41 functions as rotary unit 21 of heat generator 20.

Rotor

Rotor 41 has a rotor core 411 and a rotor conductor 412 surrounding rotor core 411. In this example, rotor conductor 412 is a squirrel cage conductor. While in this example, electric motor 10 is a squirrel cage induction motor using a squirrel cage conductor for rotor 41, it may be a wound-rotor induction motor using a winding for rotor 41. Rotor core 411 can be formed for example of a magnetic material such as a silicon steel plate. Rotor conductor 412 may be formed for example of a conductive material such as copper or aluminum.

Stator

Stator 42 is disposed outside rotor 41, and has a stator core 421 having salient poles facing rotor 41, and a stator winding 422 wound on the salient poles. Stator 42 has stator winding 422 of three phases (U-phase, V-phase, W-phase) wound on the salient poles of stator core 421 in a distributed manner. While stator winding 422 is a distributed winding, it can be a concentrated winding. In this example, stator winding 422 has each phase Y-connected (see FIG. 7). Stator core 421 is structured to have a cylindrical yoke and salient poles protruding from the yoke toward rotor 41. Stator core 421 can be formed for example of a magnetic material such as a silicon steel plate. Further, in this example, stator winding 422 is disposed in a heat transfer medium which attains a high temperature, and thus used in an environment of high temperature, and accordingly, stator winding 422 may for example be a super heat resistant winding having a ceramic insulating layer. As a matter of course, when it is used at low temperature, it can be an enameled wire such as a polyamideimide copper wire or a polyimide copper wire.

Vessel

Electric motor 10 (rotor 41 and stator 42) is housed in vessel 44. Vessel 44 is provided with a bearing 45 for rotatably supporting rotation shaft 11. Vessel 44 is, for example, a metallic vessel, and in this example, the metallic vessel is surrounded by a heat insulating material to configure a heat insulating vessel. The heat insulating material may be rock woof, glass wool, foamed plastic, brick, ceramic, or a composite material of any combination of these materials, for example. While FIG. 6 shows rotation shaft 11 housed in vessel 44, rotation shaft 11 may have opposite ends with at least one thereof pulled out of vessel 44. In that case, for example, a flywheel 15, which will be described hereinafter (see FIG. 10), can be attached to the end of rotation shaft 11 pulled out of vessel 44, or heat generator 20 (see FIG. 2 and FIG. 3) described in the first embodiment can further be coupled thereto. This also applies to the cases shown in FIGS. 8 and 9.

Vessel 44 has one end provided with an inlet 441 for receiving a heat transfer medium and the other end with an outlet 442 for discharging the heat transfer medium, and the heat transfer medium flows therethrough. The heat transfer medium receives the heat generated by electric motor 10 and is thus heated.

Electric Power Conversion Device

Electric motor 10 is connected to electric power system L via electric power conversion device 12, and receives electric power converted by electric power conversion device 12. Electric power conversion device 12 provides conversion to a three-phase alternating current of a variable frequency by an inverter to control electric motor 10 variably in speed. Electric power conversion device 12 has a single-phase alternating current conversion unit which supplies stator winding 422 with a single-phase alternating current to generate an alternating magnetic field and a three-phase alternating current conversion unit which supplies stator winding 422 with a three-phase alternating current to generate a rotating magnetic field, and electric power conversion device 12 can superimpose the single-phase alternating current and the three-phase alternating current and supply them to stator winding 422. Electric power conversion device 12 is controlled by control unit 110 (see FIG. 1).

When electric power conversion device 12 supplies stator winding 422 with a single-phase alternating current, stator 42 generates an alternating magnetic field. As the alternating magnetic field is applied to rotor 41, an induction current is generated in rotor conductor 412 through electromagnetic induction and rotor conductor 412 thus generates heat (i.e., is in a heat generation mode). That is, rotor 41 (rotor conductor 412) functions as heat generating unit 22 of heat generator 20. When rotor 41 thus functions, rotor 41 has no rotational force and input electric power will be substantially all consumed as heat, and electric motor 10 can be operated as heat generator 20. On the other hand, when stator winding 422 receives a three-phase alternating current, stator 42 generates a rotating magnetic field. As the rotating magnetic field is applied to rotor 41, rotor 41 has rotational force and thus rotates. This is the same as a normal motor's principle for operation, and a majority of input electric power will be consumed for rotation. Accordingly, superimposing the three-phase alternating current on the single-phase alternating current can cause electric motor 10 to generate heat while rotating electric motor 10, and thus allows electric motor 10 to also serve as heat generator 20. When electric motor 10 also serves as heat generator 20, it is necessary to superimpose a single-phase alternating current and a three-phase alternating current.

Further, by changing the magnitude of a single-phase AC voltage supplied to stator winding 422, the amount of heat generated by electric motor 10 can be controlled and the magnitude of the load of electric motor 10 can be changed. Specifically, when electric motor 10's rated output is represented as 100%, an output used for generating heat can be controlled in a range of 0 to 100% of the rated output. Heat generation in electric motor 10 can be considered as a load caused at electric motor 10. By controlling the mount of heat generated by electric motor 10, the load can be changed in a range of 0 to 100%. Since electric motor 10 is rotated by surplus electric power received from electric power system 1, electric motor 10 will have rotational force varying with the amount of the surplus electric power, however, the load of electric motor 10 can be changed by controlling the amount of heat generated. As such, when surplus electric power is small the amount of heat generated by electric motor 10 can be reduced whereas when surplus electric power is large the amount of heat generated by electric motor 10 can be increased so that the surplus electric power can be maximally converted to heat while electric motor 10 is kept rotated. That is, heat generation apparatus 100 has a wide operable range. The wide range of the operable range is wider than the above-described variable speed pumped storage power generation's adjustable load range, and thus believed to more significantly contribute to stabilization of electric power system L. The electric power supplied to stator winding 422 is controlled, depending on the surplus electric power, for example by a control command issued from control unit 110 (see FIG. 1).

Figure 8:
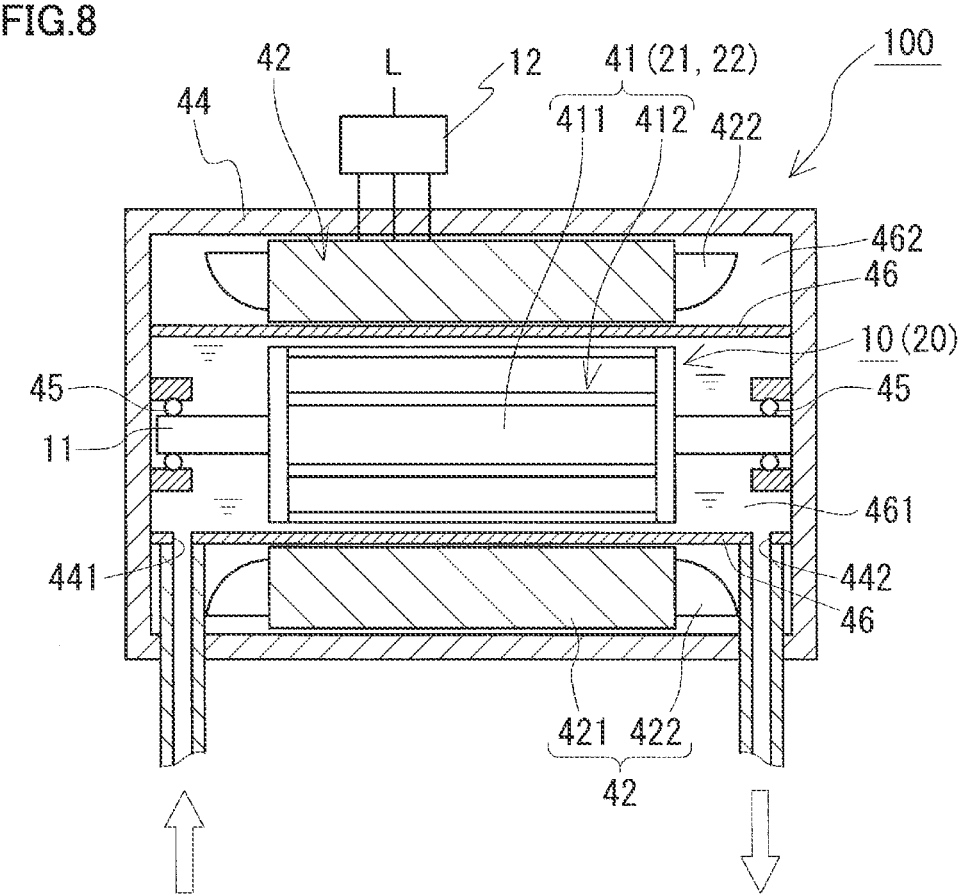
FIG. 8 schematically shows another example of the heat generation apparatus of the second embodiment.

In heat generation apparatus 100 shown in FIG. 6, electric motor 10 (rotor 41 and stator 42) is entirely housed in a single space within vessel 44. As shown in FIG. 8, a structure is also applicable in which a diaphragm 46 is provided to radially divide an interior of vessel 44 into a space that houses rotor 41 (a rotor housing chamber 461) and a space that houses stator 42 (a stator housing chamber 462). In that case, as in heat generation apparatus 100 shown in FIG. 8, inlet 441 and outlet 442 for receiving and discharging a heat transfer medium is provided to rotor housing chamber 461 to pass the heat transfer medium through rotor housing chamber 461 alone. In this example, inlet 441 is located at one end of vessel 44, and outlet 442 is located at the other end of vessel 44. As the heat transfer medium flows through rotor housing chamber 461, the heat transfer medium receives heat generated by rotor 41 (or rotor conductor 412) functioning as heat generating unit 22, and the heat transfer medium is thus heated. This can suppress heating stator 42 by the heat transfer medium heated by the heat generated by rotor 41, and hence reduce an increase of the temperature of stator winding 422. Diaphragm 46 may be provided with a heat insulating layer (not shown) by a heat insulating material to suppress conduction of heat from rotor housing chamber 461 to stator housing chamber 462.

Figure 9:
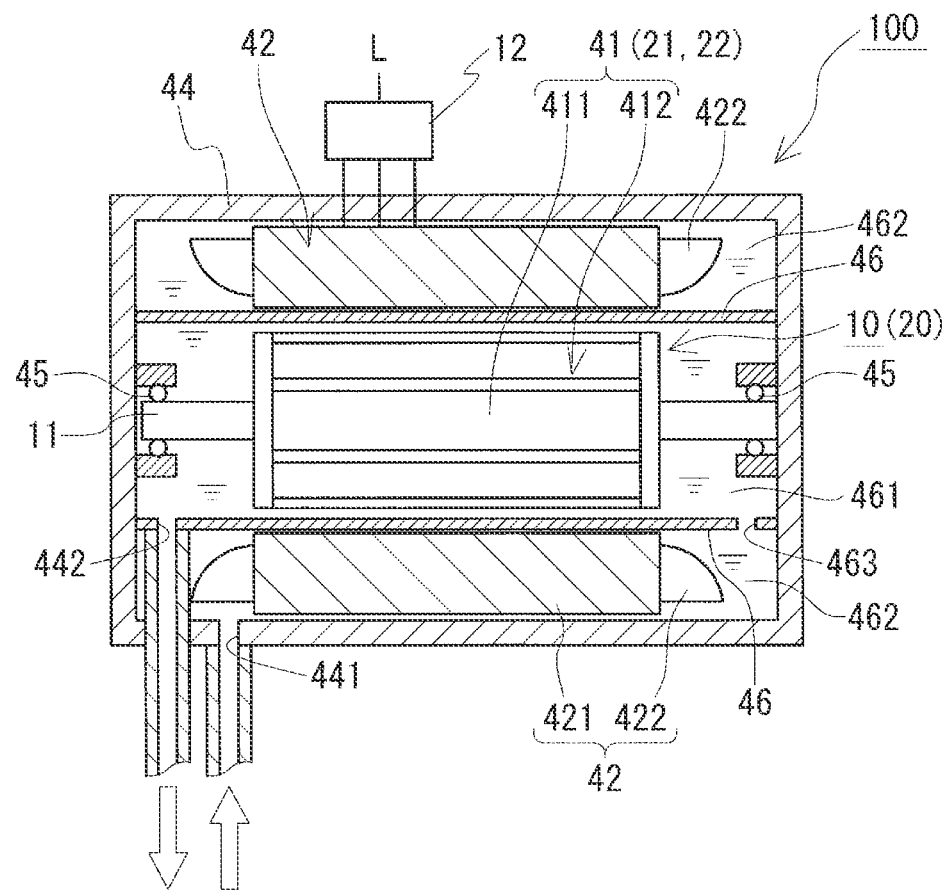
FIG. 9 schematically shows still another example of the heat generation apparatus of the second embodiment.

Furthermore, when the above structure is applied to divide an interior of vessel 44 by diaphragm 46 into rotor housing chamber 461 and stator housing chamber 462, then, as in heat, generation apparatus 100 shown in FIG. 9, it is also possible to provide stator housing chamber 462 with inlet 441 for receiving a heat transfer medium and provide rotor housing chamber 461 with outlet 442 for discharging the heat transfer medium. In that case, as shown in FIG. 9, diaphragm 46 may be provided with a communication hole 463 to allow rotor housing chamber 461 and stator housing chamber 462 to be in communication with each other. In this example, inlet 441 and outlet 442 are located at one end of vessel 44, and communication hole 463 is located at the other end of vessel 44. As a result, a heat transfer medium of low temperature is received and flows through stator housing chamber 462, and subsequently, passes through communication hole 463 and flows through rotor housing chamber 461 and is thus heated by heat generated in rotor 41 (or rotor conductor 412). Thus, before the supplied heat transfer medium is heated, the heat transfer medium can absorb heat generated by stator 42 (or stator winding 422) and thus cool stator 42 (or stator winding 422), which allows stator winding 422 to have a reduced in-use heatproof temperature. In that case, a temperature gradient will be caused between stator 42 and rotor 41.

Function and Effect

Energy storage system 1 according to each embodiment described above can exhibit the following effects.

Heat generation apparatus 100 converting surplus electric power of electric power system L to heat has a configuration in which electric motor 10 and heat generator 20 are combined together. Comprising electric motor 10 connected to electric power system L allows a frequency adjustment function to be implemented, which is effective in stabilizing electric power system L. Electric motor 10 has an inertial force as electric motor 10 rotates, and when electric power system L has a fluctuation in frequency, the fluctuation in frequency can be absorbed by the inertial force to provide instantaneous frequency adjustment. Further, comprising heat generator 20 converting the rotational force of electric motor 10 to heat allows surplus electric power of electric power system L to be absorbed. And by comprising heat storage device 200 that stores heat generated by heat generation apparatus 100, surplus electric power of electric power system L can be stored as heat. In order to sufficiently ensure the frequency adjustment performance of electric power system L and the amount of electric power generated by heat generation apparatus 100, for example, electric motor 10 preferably has a rated output of 100 kW or more, and more preferably 500 kW or more, still more preferably 1 MW or more.

Heat generation apparatus 100 of the separation type according to the first embodiment described with reference to FIGS. 2 to 4 has electric motor 10 and heat generator 20 functionally separated from each other, and is thus simple in configuration and easily controlled. On the other hand, heat generation apparatus 100 of the integrated type according to the second embodiment described with reference to FIGS. 5 to 9 has electric motor 10 per se also serving as heat generator 20, and can thus be reduced in size.

Figure 10:
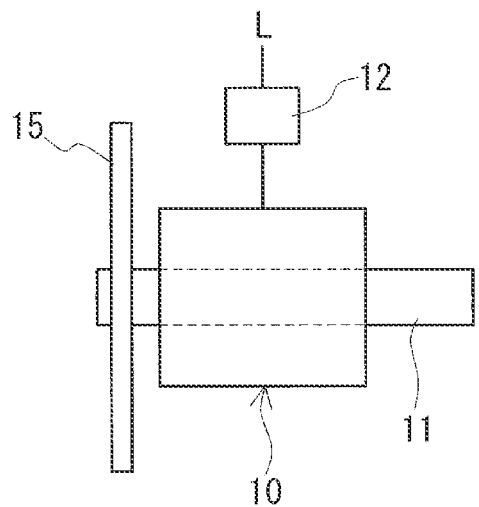
FIG. 10 is a conceptual diagram showing another example of a heat generation apparatus in an energy storage system according to an embodiment.

Furthermore, in heat generation apparatus 100 according to the first and second embodiments, as shown in FIG. 10, flywheel 15 may be provided on rotation shaft 11 of electric motor 10. This increases the inertial force of electric motor 10, and it can be expected that the instantaneous frequency adjustment function is improved.

When electric power generation apparatus 300 is comprised as in energy storage system 1 shown in FIG. 1, then, after surplus electric power of electric power system L is converted to heat and stored in heat storage device 200, the heat can be used for electric power generation, and an electric power storage system can thus be implemented.

Application of Energy Storage System

Energy storage system 1 according to an embodiment can be utilized for storing electric power of electric power system L, and can also be utilized for production of hydrogen, heating, hot water supply, thermochemical reaction, etc. Hereinafter, a system 50 enabling stable utilization of variable electric power is disclosed as one form of application of energy storage system 1 according to an embodiment.

Figure 11:
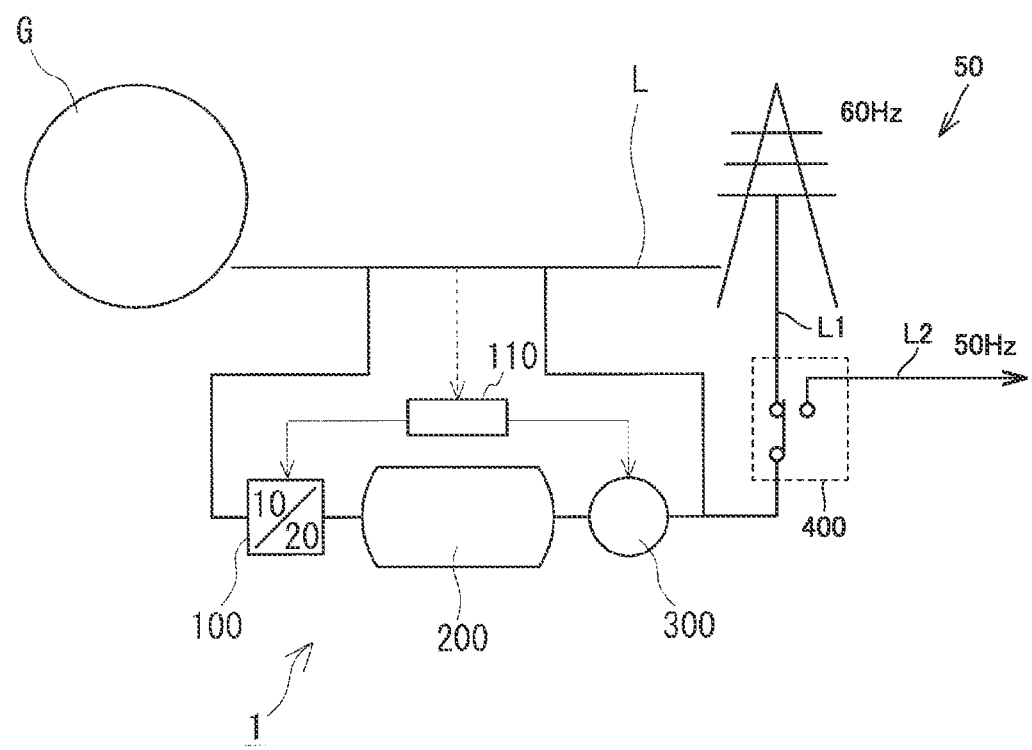
FIG. 11 schematically shows a configuration of a system enabling stable utilization of variable electric power including the energy storage system according to an embodiment.

FIG. 11 schematically shows a configuration of system 50 enabling stable utilization of variable electric power including energy storage system 1 according to an embodiment. Referring to FIG. 11, system 50 enabling stable utilization of variable electric power achieves stable electric power supply by storing surplus electric power (variable electric power) generated by a renewable energy source (electric power source G) connected to electric power system L. Furthermore, system 50 enabling stable utilization of variable electric power can utilize the variable electric power.

For example, in Japan, system 50 enabling stable utilization of variable electric power can be used for mutual accommodation of electric power through frequency conversion. In Japan, Eastern Japan and Western Japan have AC electric power sources different in frequency, Western Japan has an AC electric power source frequency of 60 Hz, whereas Eastern Japan has an AC electric power source frequency of 50 Hz. Because of the difference in frequency, the amount of electric power accommodated between Eastern Japan and Western Japan is limited by the capacity of frequency conversion facilities.

According to the configuration shown in FIG. 11, system 50 enabling stable utilization of variable electric power includes electric power generation apparatus 300 and a switch 400. Electric power generation apparatus 300 generates electric power using the heat stored in heat storage device 200. Switch 400 can switch an output of electric power generation apparatus 300 between an electric power system L1 and an electric power system L2. Electric power system L1 is an electric power system having a frequency of 60 Hz, and electric power system L2 is an electric power system having a frequency of 50 Hz.

Figure 12:
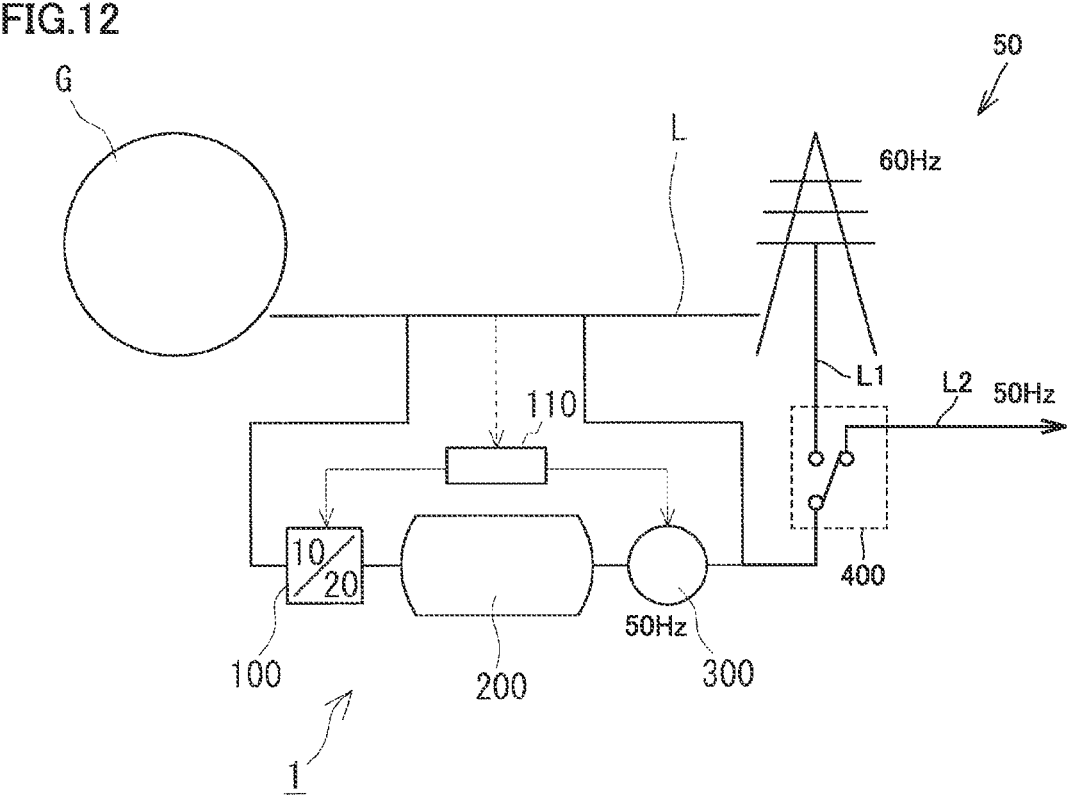
FIG. 12 shows another configuration of the system enabling stable utilization of variable electric power shown in FIG. 11.

In the state shown in FIG. 11, switch 400 connects the output of electric power generation apparatus 300 to electric power system L1. The configuration of system 50 enabling stable utilization of variable electric power in this case is equivalent to the configuration shown in FIG. 1. FIG. 12 shows another configuration of system 50 enabling stable utilization of variable electric power shown in FIG. 11. As shown in FIG. 12, switch 400 can disconnect the output of electric power generation apparatus 300 from electric power system L1 and connect it to electric power system L2.

Figure 13:
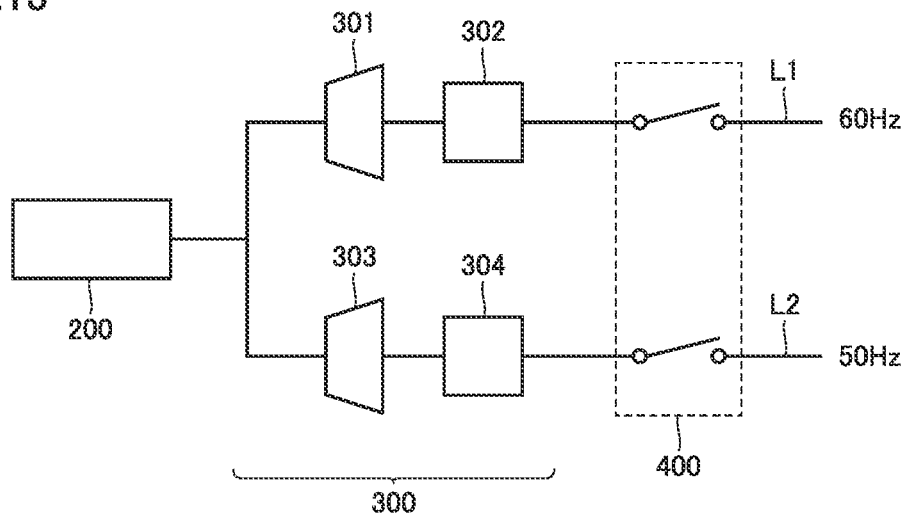
FIG. 13 shows an embodiment of an electric power generation apparatus applicable to the system enabling stable utilization of variable electric power shown in FIG. 11.
Figure 14:
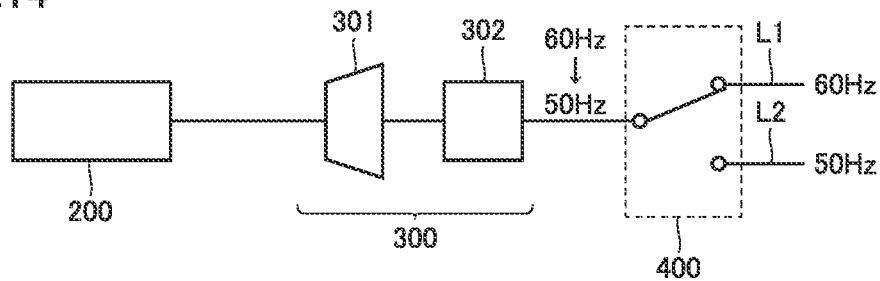
FIG. 14 shows another embodiment of the electric power generation apparatus applicable to the system enabling stable utilization of variable electric power shown in FIG. 11.
Figure 15:
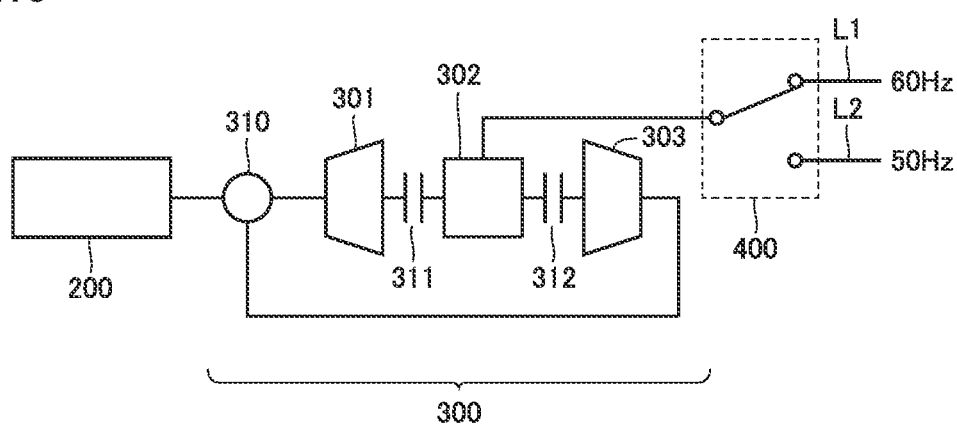
FIG. 15 shows still another embodiment of the electric power generation apparatus applicable to the system enabling stable utilization of variable electric power shown in FIG. 11.

As has been described above, electric, power generation apparatus 300 may include a steam turbine and an electric power generator. FIGS. 13 to 15 show some embodiments relevant in configuration to electric power generation apparatus 300. However, the configuration of electric power generation apparatus 300 is not limited to the configurations described below.

FIG. 13 shows an embodiment of electric power generation apparatus 300 applicable to system 50 enabling stable utilization of variable electric power shown in FIG. 11. As shown in FIG. 13, electric power generation apparatus 300 can include steam turbines 301 and 303 and electric power generators 302 and 304. Electric power generator 302 is a 60 Hz electric power generator, and electric power generator 304 is a 50 Hz electric power generator. Electric power generator 302 has its rotation shaft coupled to steam turbine 301, and electric power generator 304 has its rotation shaft coupled to steam turbine 303. Steam turbine 301 is a 3600 rpm turbine adapted to generate 60 Hz electric power. Steam turbine 303 is a 3000 rpm turbine adapted to generate 50 Hz electric power. Switch 400 switches whether to connect an output of electric power generator 302 to electric power system LL and switches whether to connect an output of electric power generator 304 to electric power system L2.

FIG. 14 shows another embodiment of electric power generation apparatus 300 applicable to system 50 enabling stable utilization of variable electric power shown in FIG. 11. As shown in FIG. 14, electric power generation apparatus 300 can include steam turbine 301 and electric power generator 302. Similarly as in the configuration shown in FIG. 13, steam turbine 301 and electric power generator 302 are adapted to generate 60 Hz AC electric power. Although reducing the rotational speed of steam turbine 301 from 3600 rpm to 3000 rpm does reduce efficiency, electric power generation apparatus 300 can generate 50 Hz AC electric power.

FIG. 15 shows still another embodiment of electric power generation apparatus 300 applicable to system 50 enabling stable utilization of variable electric power shown in FIG. 11. As shown in FIG. 15, electric power generation apparatus 300 can include steam turbines 301 and 303, electric power generator 302, a three-way valve 310, and clutches 311 and 312. Three-way valve 310 switches supply of steam between steam turbine 301 and steam turbine 303. Clutch 311 switches whether to transmit the motive force of steam turbine 301 to electric power generator 302. Clutch 312 switches whether to transmit the motive force of steam turbine 303 to electric power generator 302. When electric power generator 302 is connected to steam turbine 301, electric power generator 302 generates 60 Hz AC electric power. When electric power generator 302 is connected to steam turbine 303, electric power generator 302 generates 50 Hz AC electric power.

Figure 16:
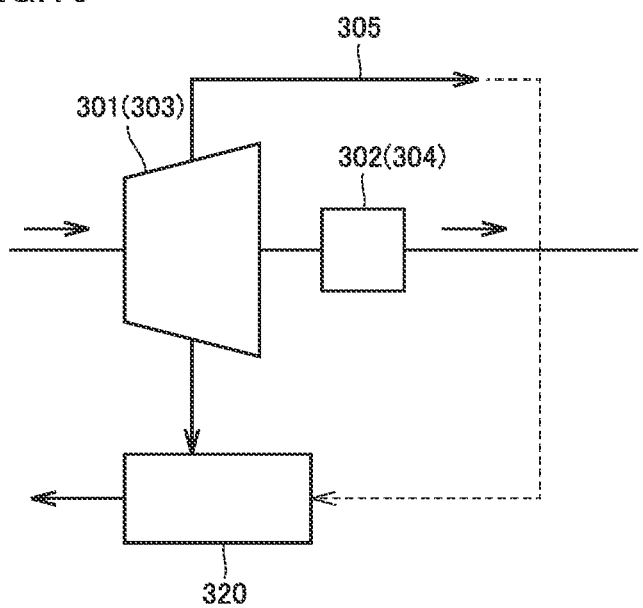
FIG. 16 shows a form in which a bleeder turbine is applied to a steam turbine shown in FIGS. 13 to 15.

As shown in FIG. 16, steam turbine 301 may be a bleeder turbine. A portion of the steam supplied to steam turbine 301 (or steam 305) is extracted from steam turbine 301, and heat of steam 305 is used. Thus, in addition to supplying electric power by electric power generator 302, heat can be supplied. A condenser 320 condenses steam 305 extracted from steam turbine 301 in addition to steam used to rotate steam turbine 301.

Steam turbine 303 shown in FIG. 13 may be a bleeder turbine. In that case, in addition to supplying electric power by electric power generator 304, heat can be supplied. One or both of steam turbines 301 and 303 may be a bleeder turbine.

An application in Japan has been indicated as a typical example of application of system 50 enabling stable utilization of variable electric power. However, system 50 enabling stable utilization of variable electric power according to an embodiment is applicable without restriction on location. For example, system 50 enabling stable utilization of variable electric power is also applicable in the United States. While the United States adopts an AC frequency of 60 Hz, the United States has a large land area, and accordingly, operates electric power systems on an area basis. While some area in the United States is excessively supplied with electric power, another area may be short of electric power. System 50 enabling stable utilization of variable electric power according to an embodiment (see FIGS. 11 and 12) is applicable to a linkage of electric power systems in those areas. In this application form, a synchronous electric power generator can be applied as an electric power generator included in electric power generation apparatus 300, and a difference in phase between the electric power systems may not be considered.

REFERENCE SIGNS LIST

G electric power source, L, L1, L2 electric power system, 1 energy storage system, 50 system enabling stable utilization of variable electric power, 100 heat generation apparatus, 110 control unit, 200 heat storage device, 300 electric power generation apparatus, 400 switch, 10 electric motor, 11 rotation shaft, 12 electric power conversion device, 15 flywheel, 20 heat generator, 21 rotary unit, 22 heat generating unit, 31 rotation shaft, 32 bearing, 33 magnetic flux generating unit 33c coil, 331 protrusion, 34 heat transfer medium channel, 34p pipe, 301, 303 steam turbine, 302, 304 electric power generator, 305 steam, 310 three-way valve, 311, 312 clutch, 320 capacitor, 341 inlet, 342 outlet, 41 rotor, 411 rotor core, 412 rotor conductor, 42 stator, 421 stator core, 422 stator winding, 44 vessel, 441 inlet, 442 outlet, 45 hearing, 46 diaphragm, 461 rotor housing chamber 462 stator housing chamber, 463 communication hole.

The invention claimed is:

1. An energy storage system comprising:
    a heat generation apparatus configured to generate heat from electric power;
    a heat storage device configured to store the heat generated by the heat generation apparatus,
    the heat generation apparatus including
        an electric motor connected to an electric power system and rotated by surplus electric power received from the electric power system, and
        a heat generator having a rotary unit rotated by the electric motor, the rotary unit including, as a magnet pole, a coil generating magnetic flux by a current passing through the coil, or a permanent magnet, the heat generator further having a heat generating unit configured to generate heat through electromagnetic induction caused by a magnetic field that changes with time in a conductor arranged near the rotary unit;
    a control unit configured to control the electric motor by receiving an operation command from an electric power monitoring system when the surplus electric power is generated, the control unit configured to adjust an amount of heat generated by the heat generator based on an amount of the surplus electric power; and
    an electric power generation apparatus configured to generate electric power using heat stored in the heat storage device.

2. The energy storage system according to claim 1, wherein
    the electric motor is a synchronous motor or an induction motor, and the heat generator is coupled to a rotation shaft of the electric motor.

3. The energy storage system according to claim 2, wherein the induction motor is a wound-rotor induction motor.

4. The energy storage system according to claim 1, wherein
the electric motor is an induction motor, and
the electric motor per se also serves as the heat generator.

5. The energy storage system according to claim 1, further comprising a flywheel on a rotational shaft of the electric motor.

6. The energy storage system according to claim 1, wherein the heat generator has the heat generating unit fixed.

7. The energy storage system according to claim 1, wherein the heat generator has the heat generating unit disposed outside the rotary unit.

8. The energy storage system according to claim 1, wherein
the heat generator includes a superconducting coil, and
the superconducting coil causes the heat generating unit to cause electromagnetic induction.

9. The energy storage system according to claim 1, wherein the magnetic field is generated in an axial direction of the electric motor or a radial direction of the electric motor.

10. The energy storage system according to claim 1, wherein the rotary unit includes, as the magnet pole, the coil, and wherein the control unit is configured to adjust the amount of heat generated by the heat generator by controlling the current passing through the coil based on the surplus electric power.

11. A system enabling stable utilization of variable electric power, comprising:
an energy storage system, including
a heat generation apparatus configured to generate heat from electric power,
a heat storage device configured to store the heat generated by the heat generation apparatus, and
an electric power generation apparatus configured to generate electric power using heat stored in the heat storage device,
the heat generation apparatus including
an electric motor connected to an electric power system and rotated by surplus electric power received from the electric power system, and
a heat generator having a rotary unit rotated by the electric motor and a heat generating unit configured to generate heat through electromagnetic induction, and configured to convert rotational force of the electric motor to heat; and
a switch configured to connect the electric power generation apparatus to any one of the electric power system and a second electric power system.

12. The system enabling stable utilization of variable electric power according to claim 11, wherein the electric power generation apparatus includes:
a first steam turbine;
a first electric power generator coupled to the first steam turbine and configured to supply the electric power system with AC electric power;
a second steam turbine; and
a second electric power generator coupled to the second steam turbine and configured to supply the second electric power system with AC electric power.

13. The system enabling stable utilization of variable electric power according to claim 11, wherein
the electric power generation apparatus includes
a steam turbine and
an electric power generator coupled to the steam turbine, and
the electric power generator is configured to be driven by the steam turbine to supply the electric power system with AC electric power of a first frequency and the second electric power system with second AC electric power having a second frequency different from the first frequency.

14. The system enabling stable utilization of variable electric power according to claim 11, wherein the electric power generation apparatus includes
an electric power generator;
a first steam turbine configured to drive the electric power generator to allow the electric power generator to supply the electric power system with AC electric power of a first frequency;
a first clutch configured to couple the first steam turbine to the electric power generator;
a second steam turbine configured to drive the electric power generator to allow the electric power generator to supply the electric power system with AC electric power of a second frequency different from the first frequency;
a second clutch configured to couple the second steam turbine to the electric power generator; and
a three-way valve configured to supply one of the first steam turbine and the second steam turbine with steam.

15. The system enabling stable utilization of variable electric power according to claim 11, wherein
the electric power generation apparatus includes
a steam turbine and
an electric power generator coupled to the steam turbine, and the steam turbine is a bleeder turbine.

* * * * *